US007848553B2

United States Patent
Hertel et al.

(10) Patent No.: US 7,848,553 B2
(45) Date of Patent: Dec. 7, 2010

(54) METHOD AND APPARATUS OF MULTI-MODALITY IMAGE FUSION

(75) Inventors: Sarah R. Hertel, Brookfield, WI (US); Gopal B. Avinash, New Berlin, WI (US)

(73) Assignee: General Electric Company, Schenectady, NY (US)

( * ) Notice: Subject to any disclaimer, the term of this patent is extended or adjusted under 35 U.S.C. 154(b) by 576 days.

(21) Appl. No.: 11/931,078

(22) Filed: Oct. 31, 2007

(65) Prior Publication Data

US 2008/0064949 A1 Mar. 13, 2008

Related U.S. Application Data

(63) Continuation of application No. 10/604,673, filed on Aug. 8, 2003, now abandoned.

(51) Int. Cl.
*A61B 5/05* (2006.01)
*G06K 9/36* (2006.01)
(52) U.S. Cl. .................. 382/128; 600/407; 600/426
(58) Field of Classification Search ........... 382/128; 600/407, 426
See application file for complete search history.

(56) References Cited

U.S. PATENT DOCUMENTS

| 5,926,568 | A * | 7/1999 | Chaney et al. ............ 382/217 |
| 5,970,499 | A * | 10/1999 | Smith et al. ............... 1/1 |
| 6,205,235 | B1 * | 3/2001 | Roberts .................... 382/128 |
| 7,720,519 | B2 * | 5/2010 | Ruohonen .................. 600/411 |
| 2001/0036302 | A1 * | 11/2001 | Miller ..................... 382/128 |
| 2003/0053668 | A1 * | 3/2003 | Ditt et al. .................. 382/128 |

OTHER PUBLICATIONS

Faber et al. "Automatic Unification of Three-dimensional Cardiac Perfusion with Three-dimensional Coronary Artery Anatomy" IEEE Computers in Cardiology, 1996.*
Burger, C., PMOD Image Fusion Tool—User's Guide, May 28, 2002, http://www.pmod.com/doc/pfus/pfusUsersGuide.html.
Wiest, P. et al., Image Fusion, Applied Radiology, Mar. 2001, pp. 9-16.
Townsend, D. et al., The Next Big Thing, Nov. 2000, http://www.imagingeconomics.com/library/200011-01.asp.
Dallessio, K., New Image Fusion Software, AHRA News, And More, Applied Radiology, Sep. 2002, pp. 28-29.
Dallessio, K., PET/CT Hybrid Imaging, Applied Radiology, Jun. 2002, pp. 18-19.
Dawant, B. et al., Brain Atlas Deformation In The Presence Of Small And Large Space-Occupying Tumors, Computer Aided Surgery, pp. 1-10, vol. 7, 2002.

(Continued)

*Primary Examiner*—Bhavesh M Mehta
*Assistant Examiner*—Stephen R Koziol
(74) *Attorney, Agent, or Firm*—Ziolkowski Patent Solutions Group, SC

(57) ABSTRACT

The present invention is directed to a method and apparatus for fusing or combining functional image data and anatomical image data. The invention, which may be carried out through user interaction or automatically, enables composite and clinically valuable images to be generated that display functional and anatomical data acquired with different imaging systems. By identifying fiducial markers on a functional data image and correlating the fiducial markers with anatomical markers or indicia on the anatomical data image, the respective images may be aligned with one another before a composite image is generated.

19 Claims, 2 Drawing Sheets

OTHER PUBLICATIONS

Finch, E., Fusion Imaging: Cardiac Applications of SPECT/CT And PET/CT, Mar. 2003, http://www.imagingeconomics.com/library/200303-16.asp.

Alyafei, S. et al., Image Fusion System Using PACS For MRI CT And PET Images, 1999, http://www.alyafei.com/PACS.html.

Warfield, S. et al., Nonlinear Registration and Template Driven Segmentation, Jun. 1999, http://splweb.bwh.harvard.edu:8000/pages/papers/warfield/ebook2/.

* cited by examiner

METHOD AND APPARATUS OF MULTI-MODALITY IMAGE FUSION

CROSS-REFERENCE TO RELATED APPLICATION

The present application is a continuation of and claims priority of U.S. Ser. No. 10/604,673 filed Aug. 8, 2003, the disclosure of which is incorporated herein by reference.

BACKGROUND OF THE INVENTION

The present invention relates generally to diagnostic imaging and, more particularly, to a method and apparatus of combining or fusing functional diagnostic data and anatomical diagnostic data acquired of a subject with imaging systems of different modalities to generate a composite image for clinical inspection.

The fusion of functional image data and anatomical image data is a widely-practiced technique to provide composite images for improved pathology identification and clinical diagnosis. Typically, the functional and anatomical image data is acquired using nuclear medicine based systems such as single-photon computed tomography (SPECT), and positron emission tomography (PET) or radiology based imaging systems such as computed tomography (CT), magnetic resonance (MR), ultrasound, and x-ray. Generally, it is desirable to "fuse" an image from SPECT or PET with an image from CT or MR. In this regard, it is typically desired for the functional image from SPECT or PET to be superimposed on the anatomical image acquired using CT or MR.

Fusion of functional and anatomical data that has been acquired separately with imaging systems predicated on different imaging technologies can be problematic. That is, the functional data may be acquired at a different time than the anatomical data. As such, patient positioning between the separate data acquisitions typically varies. Different size acquisitions with different slice thickness and pixel sizes with different central points are also not uncommon. As such, for a clinically valuable composite image to be produced, these differences as well as others typically encountered, must be resolved.

One solution has been the development of a hybrid scanner capable of acquiring PET and CT images during a single scan study in such a manner to avoid many of the drawbacks enumerated above. A combined PET/CT scanner, however, may not be feasible in all circumstances. For instance, it may not be practical for a diagnostic imaging center, hospital, or the like to replace existing PET and CT systems with a combined imager. Moreover, a combined PET/CT scanner, by definition, may generate a composite image of functional and anatomical data acquired using PET and CT, respectively. However, the scanner cannot provide a composite image of PET and MR data, SPECT and MR data, or SPECT and CT data. As such, a hybrid system may not address the myriad of diagnostic needs required of a radiologist or other health care provider in rendering a diagnosis to a patient.

Another solution that is consistent with conventional fusion techniques fails to adequately address the drawbacks associated with the overlaying of collocated functional and anatomical data that are not registered. That is, present fusion protocols combine data having a common coordinate alignment, but fail to register the functional and anatomical images. Registering is commonly defined as the process of aligning medical image data. This is based on the premise that the functional and anatomical data sets were acquired under identical physiological states and therefore can be fused without taking additional measures into account. In this regard, conventional fusion techniques orientate the functional and anatomical data but do not take measures to sufficiently align the functional and anatomical data. Furthermore, the image resolution from PET and SPECT are limited by maximum energy resolution of positron-emitting isotopes. The resolution of functional images compared to anatomical images is notably inferior. Another consideration that specifically affects cardiac imaging is the considerable amount of motion that can add additional blurring to any image set. The goal of anatomical imaging in the heart is to observe the heart without motion. Functional imaging of the heart can compensate for motion by dividing the imaging into bins but the number of bins is the denominator when the total dataset is the numerator. The number of coincidence events is limited to the number of radioactive decay events and being able to observe as much data as possible is desirable for a successful diagnosis. As a result, the radiologist or other health care provider must decipher a single composite image with the functional and anatomical information, with respect to one another, being misaligned. Additional post-fusion processing steps may be taken to correct the misalignment of the respective images.

A conventional fusion of CT and PET image data is illustrative of the above drawbacks. During a PET/CT cardiac acquisition, the CT study is performed with ECG gating and the PET study may or may not be performed with ECG gating. The anatomical position of the heart typically changes relative to the ECG cycle. During image processing the CT image is reconstructed from a portion of the data centered on a selected phase during the cardiac cycle in order to provide an image with the least amount of motion blurring artifacts. The CT coronary arteries are then tracked and segmented out of the CT image. The segmented images retain the coordinate system of the original data frozen at one particular phase of the cardiac cycle. A static or dynamic PET image may then be reconstructed from the entire set of PET data that is averaged over many ECG cycles. A gated PET image set is reconstructed for each bin in the gated study. One of these bins may correspond to the selected phase for which the CT data set was reconstructed. The alignment may further improve with such conditions. These PET images are then processed such that the left ventricle is segmented based on the long axis of the heart. Using this information, a PET 3D model can be displayed in "model" space that approximates the anatomical shape of a left ventricle. The CT image is then fused with the PET image along the model coordinates to form a composite image. However, the respective images from which the composite image is formed are not registered because the coordinate systems are not common to both image sets. Depending on the amount of image blurring due to radioactive tracer energy, degree of cardiac motion, and the modeling techniques, different amounts of misalignment may be introduced. As such, the composite image typically must undergo additional and time-consuming processing to effectively align the functional data with the anatomical data in a clinical area of interest to provide optimal images for diagnosis.

Another classic multi-modality paradigm aligns internal or external fiducial markers from a functional image with corresponding anatomical points on an anatomical image. This conventional fiducial marker-based system implements a manual method of fusion that does not take local variations in the datasets into account. The conventional automated rigid or non-rigid body registration process uses mutual information as the cost function for highlighting differences between the functional and anatomical images. The cost function therefore defines or guides the registration process of the functional data to the anatomical data. There are also methods that use fiducial markers and rigid and non-rigid affine transformation to register images. However, these automated methods do not use any localized anatomical constraints to guide them. As a result, these conventional approaches may only perform data-to-data fusion and, as such, are inapplicable when fusion between data and modeled data, or fusion between modeled data and modeled data is desired.

Therefore, it would be desirable to design an apparatus and method of fusing multi-modality images such that alignment is resolved prior to the fusion of the separate images such that post-fusion processing is reduced and supports fusion of modeled functional and/or anatomical data.

BRIEF DESCRIPTION OF THE INVENTION

The present invention is directed to a method and apparatus for fusing or combining functional image data and anatomical image data that overcome the aforementioned drawbacks. The invention, which may be carried out through user interaction or automatically, enables composite and clinically valuable images to be generated that display functional and anatomical data acquired with different imaging systems. By identifying fiducial markers on a functional data image and correlating the fiducial markers with anatomical markers or indicia on the anatomical data image, the respective images may be aligned with one another before a composite image is generated. Warping is carried out that takes into consideration anatomical constraints while maintaining alignment of the fiducial and anatomical markers.

Therefore, in accordance with one aspect of the invention, a method of medical image overlap comprises the steps of determining at least two anatomical fiducial markers on a functional image and determining corresponding points to the at least two anatomical fiducial markers on an anatomical image. The method also includes the step of aligning the at least two anatomical fiducial markers with the corresponding points on the anatomical image and the step of warping the functional image to fit constraints of the anatomical image while maintaining alignment of the at least two anatomical fiducial markers and the corresponding points on the anatomical image.

According to another aspect of the invention, a diagnostic image generation system includes at least one database containing functional and anatomical image data and a computer programmed to determine at least a pair of fiducial markers on a functional image. The computer is also programmed to locate corresponding anatomical indicia on an anatomical image and generate a composite image of the functional image and the anatomical image such that the fiducial markers and the anatomical indicia are aligned and anatomical constraints are observed.

In accordance with yet another aspect of the present invention, a computer readable storage medium has a computer program stored thereon. The computer program represents a set of instructions that when executed by a computer cause the computer to access functional image data of a medical patient as well as anatomical image data of the medical patient. The computer is then programmed to identify more than one fiducial marker in the functional image data and identify anatomical locations in the anatomical image data that correspond to the more than one fiducial marker. The set of instructions further cause the computer to generate an image with the functional image data superimposed on the anatomical image data that considers anatomical constraints.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The present invention will be described with respect to a process, which may be carried out through interaction with a user or automatically, to generate a composite diagnostic image of functional and anatomical data acquired separately with a PET imaging system and a CT imaging system. One skilled in the art will appreciate, however, that imaging systems of other modalities such as MR, SPECT, ultrasound, x-ray, and the like may be used to acquire the functional and anatomical data to be combined into a composite image. Further, the present invention will be described with respect to the acquisition and imaging of data from a cardiac region of a patient. However, one skilled in the art will appreciate that the present invention is equivalently applicable with data acquisition and imaging of other anatomical regions of a patient.

Figure 1:
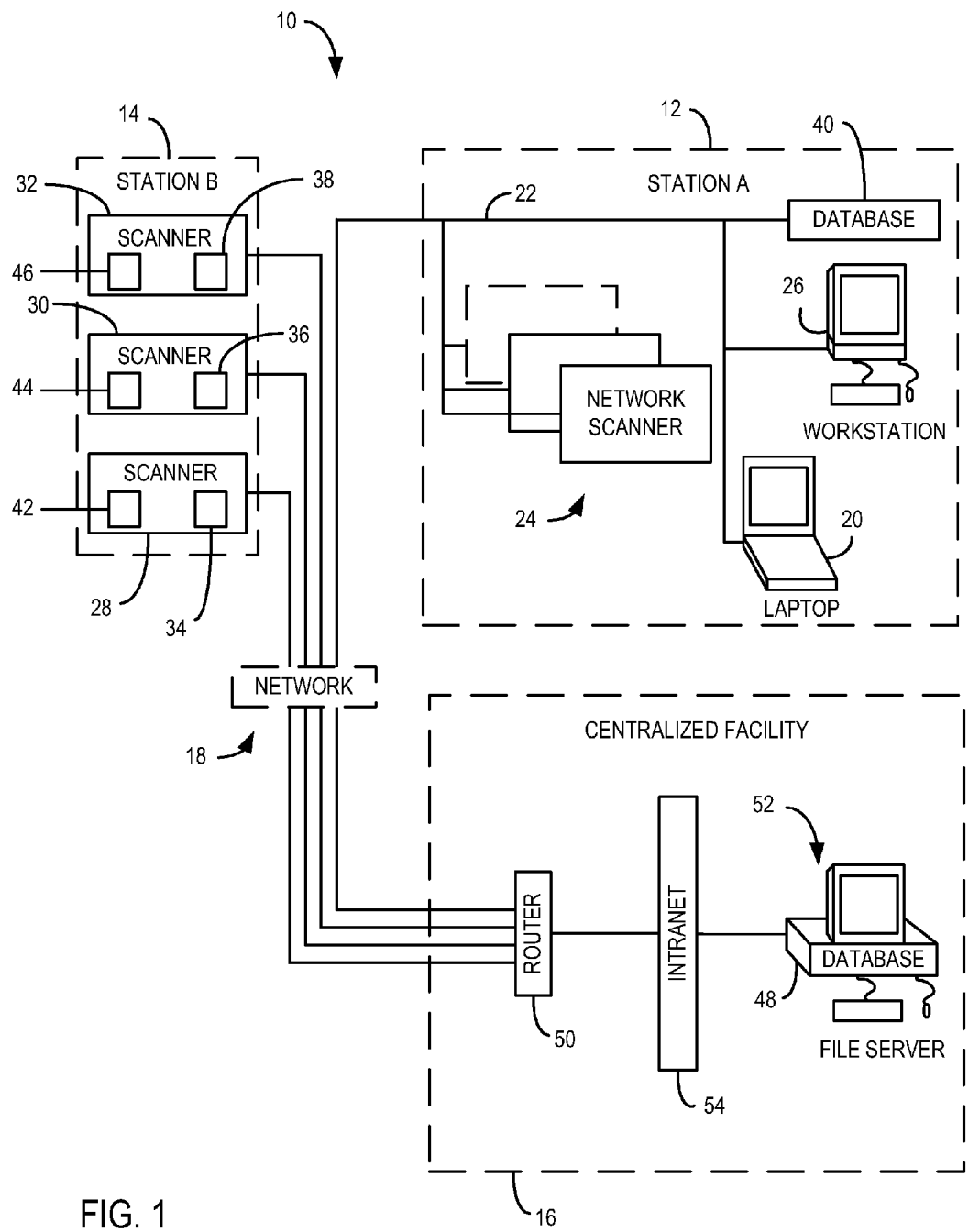
FIG. 1 is a schematic representation of a multi-node network of medical imaging systems applicable with the present invention.

Referring now to FIG. 1, an overview block diagram of a medical diagnostic and service networked system 10 is shown which includes a plurality of remote treatment stations, such as Station A referenced with numeral 12, and Station B referenced with numeral 14, which may include a medical treatment facility, hospital, clinic, or mobile imaging facility. It is understood, that the number of treatment stations can be limitless, but two specific embodiments are shown with Station A and Station B, which will be further explained hereinafter. The treatment stations 12, 14 are connected to a centralized facility 16 through a communications link 18, such as a network of interconnected server nodes. This network of interconnected nodes may be a secure, internal, intranet or a public communications network, such as the internet Although a single centralized facility is shown and described, it is understood that the present invention contemplates the use of multiple centralized facilities, each capable of communication with each treatment station. Each treatment station has operational software associated therewith which can be serviced by the centralized facility 16.

The various systems disclosed are configured to be selectively linked to the centralized facility 16 by a workstation, which in the example of treatment station 12, includes a laptop computer 20 or permanent workstation 26 connected to an internal network 22. Such selective linking is desirable for accessing data from the systems and transmitting data to the systems.

In general, a treatment site may have a number of devices such as a variety of medical diagnostic systems of various modalities. As another example, in the present embodiment, the devices may include a number of networked medical image scanners 24 connected to the internal network 22. Alternately, a treatment station or treatment site 14 can include a number of non-networked medical image scanners 28, 30, and 32 each having a computer or work station associated therewith and having an internal modem or network connection device 34, 36, and 38 to connect the remote treatment station to a communications link 18, such as the internet, to communicate with centralized facility 16.

It is understood that each of the network scanners 24 has its own workstation for individual operation and are linked together by the internal network 22. Additionally, each of the network/scanners may be linked to a local database 40 configured to store data associated with imaging scan sessions, as will be discussed shortly. Further, such a system is provided with communications components allowing it to send and receive data over a communications link 18. Similarly, for the non-networked medical image scanners at remote treatment station 14, each of the scanners 28, 30, and 32 is connected to communications link 18 through which they can communicate with the centralized facility 16. Furthermore, each scanner 28, 30, 32 may include a database 42, 44, 46, respectively, for storing scanning data. Scanning data may be transferred to a centralized database 48 through communications link 18 and router 50. The centralized database 48 is included in a remote file server 52, where workstations and scanners, external to the local intranet containing the centralized database 48, can access the database as though located locally on the intranet 54. More specifically, as will be described, workstations 20, 26 can access the data stored in the centralized database 48, or other remote database, such as database 40, as though the data were stored in a database within the specific workstation requesting the data.

The embodiment shown in FIG. 1 contemplates a medical facility having such systems as MRI systems, ultrasound systems, x-ray systems, CT systems, as well as PET systems, nuclear imaging systems, or any other type of medical imaging system, however, the present invention is not so limited. Such facilities may also provide services to centralized medical diagnostic management systems, picture archiving and communications systems (PACS), teleradiology systems, etc. Such systems can be either stationary and located in a fixed place and available by a known network address, or be mobile having various network addresses. In the embodiment shown in FIG. 1, each treatment station 12, 14 can include any combination of the aforementioned systems, or a treatment station may have all of a single type of system. Each system is connectable and can transmit data through a network and/or with at least one database 40, 48. However, it is understood that the single representation of the centralized database 48 is for demonstrative purposes only, and it is assumed that there is a need for multiple databases in such a system.

As previously discussed, each of the systems and substations described herein and referenced in FIG. 1 may be linked selectively to the centralized facility 16 via a network 18. According to the present invention, any acceptable network may be employed whether public, open, dedicated, private, or so forth. The communications links to the network may be of any acceptable type, including conventional telephone lines, fiber optics, cable modem links, digital subscriber lines, wireless data transfer systems, or the like. Each of the systems is provided with communications interface hardware and software of generally known design, permitting them to establish network links and exchange data with the centralized facility 16. However, the systems or particularly, workstations 20, 26 are provided with specialized software so as to communicate with the centralized facility 16 and particularly with the remote database 48 as though the data stored in the remote database is located locally on workstation 20. In some cases, during periods when no data is exchanged between the customer stations and the centralized facility, the network connection can be terminated. In other cases, the network connection is maintained continuously.

In one embodiment, the scanning data from as imaging session, for example, on scanner 24, is automatically transmitted from the scanner to the database 48. That is, database 48 is automatically updated after each imaging scan is executed. Records must be maintained as to the dosage used and catalogued according to the particular diagnostic procedure as well as the individual patient. From these records, the treatment facilities or institutions may ensure conformity with dosage guidelines and regulations. Further, as a result of maintaining an active database storing scan parameter values of executed imaging sessions, a user or prescriber of an imminent imaging session may query the database to later retrieve scanning data for review from any workstation 20, 26 that is permitted to access the remote database 48.

As described above, the database having the scan parameter values stored thereon may be accessed from a number of scanners that are remotely located from the database. Furthermore, there is no requirement that each scanner be physically located in the same treatment station or facility. That is, a scanner located in station 12 may electronically transmit and receive data from the remote database 48 while simultaneously therewith any scanner 28, 30, 32 in station 14 may likewise transmit and receive data to and from database 48. Later a workstation 20, 26 at any locality, for example that may be remote to both the scanner 24 and the centralized facility 16, can access the data from any scanner 24, 28, 30, 32 by accessing the centralized facility 16. Furthermore, database 48 need not be located in a separate centralized facility 16. That is, database 48 may be located in either one of stations 12, 14 as well as be remotely located within that station or treatment facility and the workstation 20, 26 requiring access to the scanning data.

Figure 2:
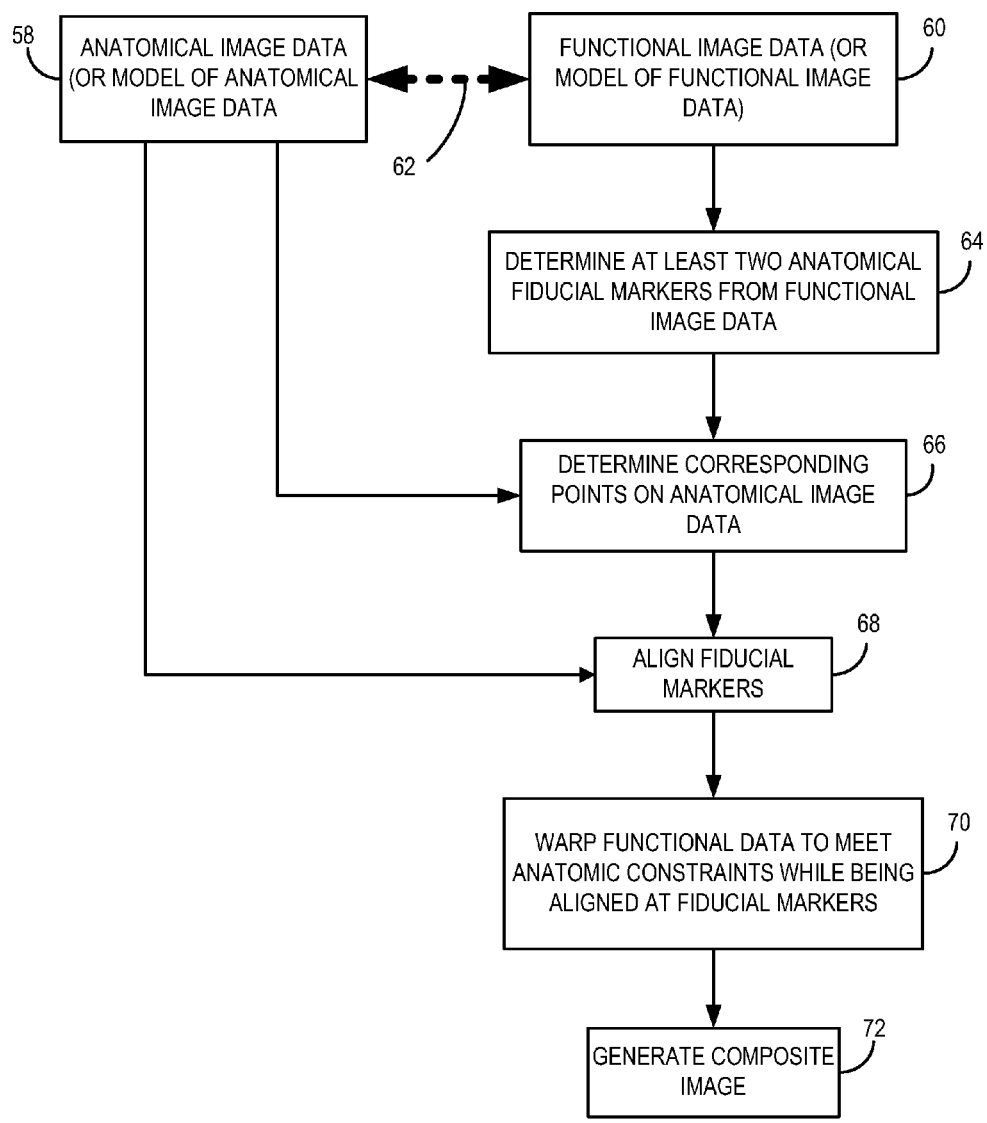
FIG. 2 is a flow chart setting forth the steps of a functional image data and anatomical image data fusion technique in accordance with the present invention.

Referring now to FIG. 2, the steps of a processing technique or method for aligning and registering functional and anatomical data acquired from separate imaging systems built on separate imaging technologies are set forth. The process may be automated or guided through user interactions and commands.

Process 56 begins with the accessing of anatomical image data 58 and functional image data or a model of functional image data 60. A model of functional image data may be defined as segmented image data with arbitrary or similar intensities as the original functional image data from which the model was generated. Arrow 62 indicates that the anatomical image data and the functional image data are geometrically collocated. That is, the anatomical and functional data are geometrically oriented about a common coordinate system; however, the data are not registered.

Process 56 continues with the identification of anatomical fiducial markers on the functional image 64. Preferably, at least two reference markers are identified. The reference markers, as will be described below, are used to identify corresponding anatomical locations on the anatomical image. Additionally, it is preferred that the fiducial markers be internal anatomical features. However, external surface markers may be used, but the external markers must be used during the acquisition of the functional data as well as the anatomical data. This may be problematic given that the functional data may be acquired at a different time and location than the acquisition of the anatomical data. For example, in a cardiac study, the reference markers may include the ventricular grooves between respective ventricles of a patient's heart.

Following determination and identification of fiducial markers on the functional image, corresponding anatomical indicia or points are determined 66 on the anatomical image. In the cardiac study example given above, the ventricular grooves would be identified on the anatomical image. Once the corresponding anatomical indicia are determined and identified, the functional image is overlaid 68 on the anatomical image such that anatomical indicia and the fiducial markers are cooperatively aligned. In this regard, in a preferred embodiment, the anatomical image remains fixed and the functional image is superimposed thereon.

The aligning of the fiducial markers and the corresponding anatomical indicia may be carried automatically by a computer programmed to do so or may be done through user interaction with a graphical user interface (GUI) displaying each of the images. In this regard, the user, such a radiologist, technician, or health care professional, may electronically "grab" the functional image, "drag" the image over the anatomical image such that the fiducial markers and anatomical indicia are aligned, and "drop" the functional image on the anatomical image. In another embodiment, the user may identify or "highlight" the respective fiducial markers and anatomical indicia, and then instruct the computer to overlay or superimpose the functional image on the anatomical image. Additionally, to sufficiently align the fiducial markers and the corresponding anatomical indicia it may be necessary to carry out various translation, scaling, and rotation processes.

Process 56 continues at step 70 with the warping of the functional data to the anatomical data such that anatomical constraints are met while maintaining alignment of the fiducial markers and the corresponding anatomical indicia. In this regard, the process tailors the warping process to anatomical constraints of the anatomical data rather than a direct warping of the functional and anatomical data. For instance, in the cardiac example above, the health care provider will recognize that the functional data corresponds to ventricular anatomy and the anatomical data corresponds to the coronary artery. As it is common for the coronary arteries to be located on the outer surfaces of the ventricles, warping would be applied locally such that the coronary arteries of the anatomical image lay on the outer surface of the ventricular anatomy of the functional image. In this case, enforcing the anatomical constraint requires that the nearest point on the ventricular surface project onto the location of the coronary artery while maintaining a smooth surface. As a result, the functional and anatomical are more precisely aligned and the composite image generated at step 72 is clinically valuable. As noted above, anatomical constraints are application and modality dependent and are useful for creating clinically meaningful results. In this invention, the anatomic constraints are used to define physical relationships between aspects covered by functional and anatomic data, and to enforce known relationships between functional and anatomic data.

Warping is an elastic registration process that may be used to fuse or combine images acquired from scanners of separate modalities. With warped, elastic transformation techniques, multi-scale, multi-region, pyramidal approaches are implemented. As such, a cost function is utilized to highlight differences between the images on a scale-by-scale basis such that the differences are optimized at every scale. That is, an image is sampled at a given scale and then is segmented or divided into multiple regions. Separate shift vectors are then determined or calculated at different regions. The vectors are interpolated to generate a smooth shift transformation which is applied to warp the image. The image is then re-sampled and the registration process is repeated at successive scales until a pre-determined final scale is reached.

The above process has been described with respect to the fusion of data between anatomical image data and either functional image data or modeled functional image data. The process, however, may be equivalently carried out to fuse modeled anatomical image data and either functional image data or modeled functional image data.

Therefore, in accordance with one aspect of the invention, a method of medical image overlap comprises the steps of determining at least two anatomical fiducial markers on a functional image and determining corresponding points to the at least two anatomical fiducial markers on an anatomical image. The method also includes the step of aligning the at least two anatomical fiducial markers with the corresponding points on the anatomical image and the step of warping the functional image to fit constraints of the anatomical image while maintaining alignment of the at least two anatomical fiducial markers and the corresponding points on the anatomical image.

According to another aspect of the invention, a diagnostic image generation system includes at least one database containing functional and anatomical image data and a computer programmed to determine at least a pair of fiducial markers on a functional image. The computer is also programmed to locate corresponding anatomical indicia on an anatomical image and generate a composite image of the functional image and the anatomical image such that the fiducial markers and the anatomical indicia are aligned and anatomical constraints are observed.

In accordance with yet another aspect of the present invention, a computer readable storage medium has a computer program stored thereon. The computer program represents a set of instructions that when executed by a computer cause the computer to access functional image data of a medical patient as well as anatomical image data of the medical patient. The computer is then programmed to identify more than one fiducial marker in the functional image data and identify anatomical locations in the anatomical image data that correspond to the more than one fiducial marker. The set of instructions further cause the computer to generate an image with the functional image data superimposed on the anatomical image data that considers anatomical constraints.

The present invention has been described in terms of the preferred embodiment, and it is recognized that equivalents, alternatives, and modifications, aside from those expressly stated, are possible and within the scope of the appending claims.

What is claimed is:

1. A method of medical image overlap comprising the steps of:
   determining at least two anatomical fiducial markers on a functional image;
   determining corresponding points to the at least two anatomical fiducial markers on an anatomical image;
   aligning the at least two anatomical fiducial markers with the corresponding points on the anatomical image;
   warping the functional image to fit constraints of the anatomical image while maintaining alignment of the at least two anatomical fiducial markers and the corresponding points on the anatomical image; and
   enforcing anatomical constraints during warping by projecting a nearest point on the functional image onto the anatomical image.

2. The method of claim 1 further comprising the step of accessing a model of functional data prior to determining the at least two anatomical fiducial markers.

3. The method of claim 1 wherein the functional image includes perfusion data and the anatomical image includes anatomical data of a coronary artery.

4. The method of claim 3 wherein the at least two anatomical fiducial markers and the corresponding points on the anatomical image correspond to ventricle grooves between ventricles of a medical patient.

5. The method of claim 4 wherein each of the perfusion data and the anatomical data include gated images acquired at different times.

6. The method of claim 3 wherein the perfusion data includes data acquired with positron emission tomography (PET) and the anatomical data includes data acquired with computed tomography (CT).

7. The method of claim 3 further comprising the step of determining anatomical constraints of the functional image based on cardiac motion.

8. The method of claim 1 wherein the step of determining the at least two anatomical fiducial markers includes the step of locating the at least two anatomical fiducial markers in a three-dimensional image.

9. The method of claim 1 wherein the step of aligning includes registering the functional image and the anatomical image by at least one of translating, scaling, and rotating the functional image and the anatomical image with respect to one another.

10. A diagnostic image generation system comprising:
at least one database containing functional and anatomical image data; and
a computer programmed to:
determine at least a pair of fiducial markers on a functional image;
locate corresponding anatomical indicia on an anatomical image; and
generate a composite image of the functional image and the anatomical image such that the fiducial markers and the anatomical indicia are aligned and anatomical constraints are considered, wherein in being programmed to generate the composite image, the computer is programmed to:
warp the functional image such that functional image data is fit to anatomical constraints of the anatomical image; and
enforce anatomical constraints during warping by projecting a nearest point on the functional image onto the anatomical image.

11. The system of claim 10 wherein the computer is further programmed to at least one of translate, scale, and rotate the functional image and the anatomical image with respect to one another such that the at least the pair of fiducial markers and the anatomical indicia are cooperatively aligned.

12. The system of claim 10 wherein the functional image corresponds to perfusion data acquired of a patient using PET and the anatomical image corresponds to coronary artery data of the patient acquired using CT, wherein the perfusion data is acquired at a different time than the coronary artery data.

13. The system of claim 12 wherein the functional image data and the anatomical image data include gated data.

14. The system of claim 10 wherein the functional image is a 3D approximate model of a patient anatomy.

15. The system of claim 10 wherein the computer is further programmed to isolate ventricular grooves when determining the at least a pair of fiducial markers.

16. A non-transitory computer readable storage medium having a computer program stored thereon, the computer program representing a set of instructions that when executed by a computer cause the computer to:
access functional image data of a medical patient;
access anatomical image data of the medical patient;
identify more than one fiducial marker in the functional image data;
identify anatomical locations in the anatomical image data that correspond to the more than one fiducial marker;
warp the functional image data to fit constraints of the anatomical image data;
enforce anatomical constraints during warping by projecting a nearest point on the functional image onto the anatomical image; and
generate an image with the functional image data superimposed on the anatomical image data that considers anatomical constraints.

17. The computer readable storage medium of claim 16 wherein the set of instructions further causes the computer to align the more than one fiducial marker with the anatomical locations.

18. The computer readable storage medium of claim 16 wherein the functional data includes positron emission tomographic (PET) perfusion data of a coronary region of a medical patient and the anatomical image data includes computed tomographic (CT) coronary artery data of the medical patient, wherein acquisition of the PET perfusion data is at a one of a different time and a different location than acquisition of the CT coronary artery data.

19. The computer readable storage medium of claim 16 wherein the functional image data and the anatomical image data are geometrically collocated.

* * * * *